United States Patent
Gajtka, Jr. et al.

(10) Patent No.: US 8,518,509 B2
(45) Date of Patent: Aug. 27, 2013

(54) DECORATIVE GLASS PANEL AND METHOD OF PRODUCTION

(75) Inventors: Terry L. Gajtka, Jr., Archdale, NC (US); Tina M. Robinson, Thomasville, NC (US)

(73) Assignee: Glass Unlimited of High Point, Inc., High Point, NC (US)

( * ) Notice: Subject to any disclaimer, the term of this patent is extended or adjusted under 35 U.S.C. 154(b) by 275 days.

(21) Appl. No.: 12/838,708

(22) Filed: Jul. 19, 2010

(65) Prior Publication Data

US 2012/0015125 A1    Jan. 19, 2012

(51) Int. Cl.
*B44F 1/06* (2006.01)

(52) U.S. Cl.
USPC ............................................. 428/38; 428/173

(58) Field of Classification Search
USPC ..................... 428/38, 173; 52/314
See application file for complete search history.

(56) References Cited

U.S. PATENT DOCUMENTS

| | | | |
|---|---|---|---|
| 1,785,401 A | 11/1929 | Zuckerberg | |
| 4,129,671 A | 12/1978 | Greenberg | |
| 4,318,946 A | 3/1982 | Pavone | |
| 4,488,919 A | 12/1984 | Butler | |
| 4,495,739 A | 1/1985 | Drennan | |
| 4,619,850 A | 10/1986 | Charlton | |
| 5,098,760 A * | 3/1992 | Fletcher | 428/46 |
| 5,409,416 A | 4/1995 | Eichhorn | |
| 5,631,057 A | 5/1997 | Sundet | |
| 5,811,173 A | 9/1998 | Eichhorn | |
| 5,840,391 A | 11/1998 | Eichhorn | |
| 5,843,546 A | 12/1998 | Eichhorn | |
| 5,853,835 A * | 12/1998 | Leniton | 428/38 |
| 5,853,852 A | 12/1998 | Eichhorn | |
| 6,461,705 B2 | 10/2002 | Eichhorn | |
| 6,524,674 B1 | 2/2003 | Eichhorn | |
| 6,752,891 B2 | 6/2004 | Eichhorn | |

* cited by examiner

*Primary Examiner* — Alexander Thomas
(74) *Attorney, Agent, or Firm* — Womble Carlyle Sandridge & Rice, LLP

(57) ABSTRACT

A decorative glass panel, and a method of production thereof, is provided for a door or window, and comprises a flat glass panel having an outer surface, an inner surface, and a thickness. A prescribed pattern is formed in at least the outer surface of the flat glass panel, the prescribed pattern including at least one substantially V-shaped groove. Each groove so formed has a width of between 9.0 mm and 19.5 mm and a depth of between 0.5 mm and 1.5 mm. An air-curable resin is applied within each substantially V-shaped groove forming the prescribed pattern.

10 Claims, 3 Drawing Sheets

DECORATIVE GLASS PANEL AND METHOD OF PRODUCTION

FIELD OF THE INVENTION

The present invention is directed to decorative glass panels, and, more particularly, to the production of glass window and door panels having decorative patterns of intersecting grooves formed in at least one surface, and a decorative material, such as a resin, applied therein forming the decorative patterns.

BACKGROUND OF THE INVENTION

In recent years, decorative glass has increased in popularity in both commercial and residential usage. It is now commonplace for decorative glass sheets to be used in buildings and homes in various types of doors such as entry, storm, and patio doors, as well as for exterior windows such as garden bath windows. Decorative glass also has become increasingly popular for interior glass doors, such as shower doors and French doors, as well as in furniture and architectural applications. As the scope and popularity of usage has grown, so has the demand for more affordable decorative glass products that simulate expensive materials and features. Accordingly, cost effective methods for producing affordable high quality simulated decorative glass products have been sought.

The prior art discloses methods of forming patterns or lettering on materials other than paper, such as glass or plastic, by screen printing, stenciling, or painting. The most popular of these methods has been screen printing. There is also known a method of applying a decorative pattern on a glass panel for a window or door by applying a continuous bead of durable resin onto the planar surface of the window or door panel. The simulated decorative appearance, however, is limited by the lack of surface details, such as varying contours in the glass. This could otherwise enhance the appearance of the decorative glass sheet, or alternatively, simulate a decorative glass window or door comprising multiple pieces of beveled glass that are joined by a decorative material, simulating the came that was used in window and door constructions in earlier eras.

SUMMARY OF THE INVENTION

The present invention is directed to a glass panel having decorative patterns formed on at least one surface, which addresses the shortcomings described above. Accordingly, one aspect of the present invention is directed to a decorative glass panel for a door or window, comprising a flat glass panel having an inner surface, and outer surface, and a prescribed thickness. The decorative glass panel described herein may be selected for either interior or exterior applications, as the materials, i.e., the glass and decorative resin material applied thereto, have been found to be suitable for exposure to harsh outdoor elements The glass panels so selected are safety-tempereded. A prescribed pattern is formed in at least one of the inner or outer surfaces of the glass panel by diamond-cutting one or more substantially V-shaped grooves into the surface of the glass panel. In one exemplary embodiment, the V-shaped grooves have a width, as measured across the surface of the glass panel, of about 14 mm, and a depth, as measured downwardly from the surface of the glass panel of about 1 mm. Optionally, once the decorative pattern has been cut into the surface of the glass panel, the V-shaped grooves are polished to provide a more aesthetic, finished appearance.

A continuous bead of an air-curable acrylic resin is applied in the V-shaped grooves throughout the prescribed pattern. One such air-curable resin is formed by mixing a resin such as R.L. ACRY 14 with a resin hardener such as R.L.H. ACRY 15, manufactured by Creative Resins of Kent, England. To achieve the desired appearance, the bead of air-curable acrylic resin is applied to a width of about 5 mm, as measured horizontally, and has a depth equal to or greater than the depth of the V-shaped grooves. A computer-driven plotter is used to apply the bead of air-curable acrylic resin within the grooves forming the pattern, on a plotter table. One suitable computer-driven plotter is an X-Y plotter manufactured by Precix Advanced Cutting Technologies, Inc., Langley, British Columbia, Canada. The glass panel will then have the appearance of individual glass sections that are connected by lead came.

A second aspect of the present invention is to provide a decorative window or door consisting of a peripheral support frame and a glass panel secured and supported by that frame. Depending upon the application chosen, the peripheral support frame desirably has a pair of opposed spaced-apart side pieces and a pair of opposed spaced-apart end pieces. The frame may be formed in any number of ways using a variety of materials to support the glass panel including, for example, conventional wooden frames wherein the glass panel is placed within an opening formed in the frame and thereafter secured with peripheral moulding, or the like. The decorative glass panel selected for the window or door would be formed as described above.

Another aspect of the present invention is to provide a method for making a decorative glass panel, simulating individual glass panels connected by lead came, or other decorative patterns. As described above, a prescribed pattern is formed in at least one of the inner or outer surfaces of the glass panel by diamond-cutting one or more substantially V-shaped grooves into the surface of the glass panel. In the exemplary embodiment described above, the V-shaped grooves have a width, as measured across the surface of the glass panel, of about 14 mm, and a depth, as measured downwardly from the surface of the glass panel of about 1 mm. Again, optionally, once the decorative pattern has been cut into the surface of the glass panel, the V-shaped grooves are polished to provide a more aesthetic, finished appearance. The computer-driven plotter then applies the bead of air-curable acrylic resin within the substantially V-shaped grooves of the formed decorative pattern. Once the resin has been applied, the resin is allowed to air-cure for 24 to 48 hours at an ambient temperature of approximately 72° F. Alternatively, higher ambient temperatures or convection heating will cure the resin at an accelerated rate, until the resin has cured to a sufficient hardness.

These and other aspects of the present invention will become apparent to those skilled in the art after a reading of the following description of an exemplary embodiment, when considered with the drawings.

DETAILED DESCRIPTION

Figure 1:
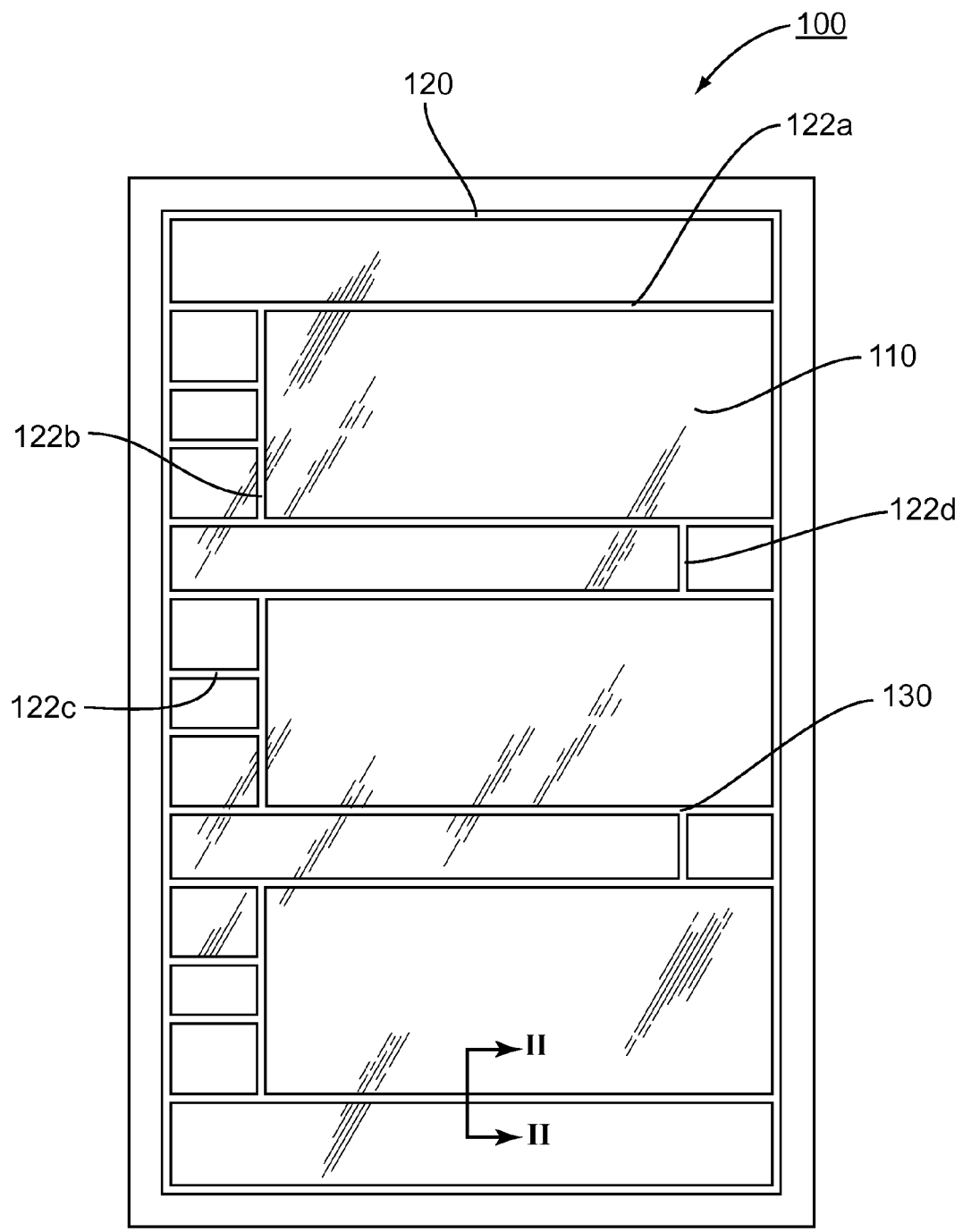
FIG. 1 is a front plan view of a decorative glass panel with a decorative pattern formed therein according to the present invention.

Referring now to the drawings in general and to FIG. 1, in particular, it will be understood that the illustrations are for the purpose of describing an exemplary embodiment of the invention and are not intended to limit the invention thereto. As seen in FIG. 1, one aspect of the present invention is directed to a decorative glass panel, generally designated 100, comprising a glass panel 110 with a decorative pattern 120 formed therein. The ornamental decorative pattern 120 is exemplary only, and not limiting to the number of possible ornamental decorative patterns which may be formed on the glass sheet of the present invention.

Figure 2:
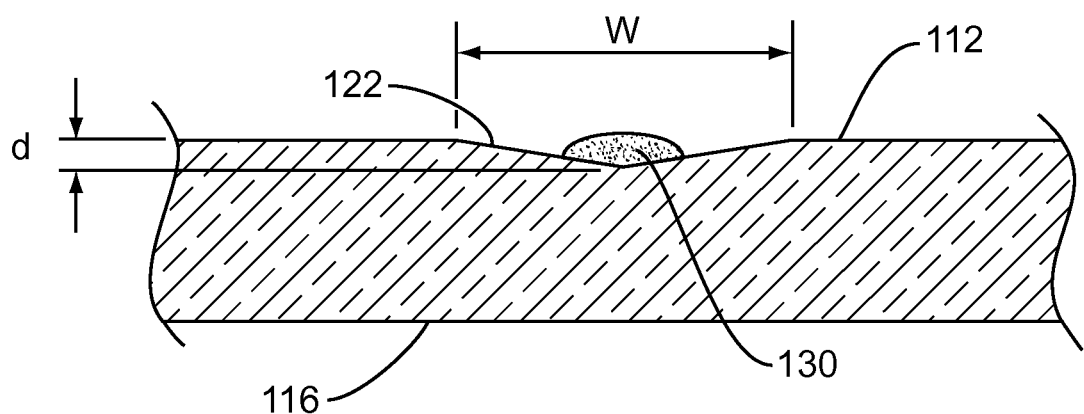
FIG. 2 is a schematic, cross sectional view of the decorative glass panel taken along Line 2-2 of FIG. 1.

Referring to FIG. 2, the glass panel 110 has an outer surface 112 and an inner surface 116. A glass panel 110 of appropriate type and size is chosen for the particular application. Glass panels are safety- tempered. In the exemplary embodiment described herein, the glass panel 110 is monolithic; i.e., a single sheet.

A selected decorative pattern 120 is formed in at least the outer surface 112 of the glass panel 110. When a decorative pattern is also formed on the inner surface of the glass panel 110, it will be appreciated that the decorative pattern on the inside will coincide precisely with the decorative pattern 120 on the outside. The pattern 120 comprises at least one substantially V-shaped groove 122 and may be continuous, such as a circular or oval pattern and/or may comprise a plurality of V-shaped grooves 122 forming straight line segments, which may or may not intersect to form the overall pattern 120. As shown in FIG. 1, the decorative pattern 120 comprises a plurality of intersecting straight line segments, including for example, 122a-d. The V-shaped grooves are diamond-cut with a fine diamond head, such as a CNC (computer numerically controlled) Stone/Glass Router, Model Compact Groove, available from Intermac America, of Black Mountain, N.C. For structural, functional, and aesthetic considerations, the inventors have found that the V-shaped groove(s) 122 should be formed with a width "w," as shown in FIG. 2, of between about 9.0 mm and 19.5 mm, as measured across the surface 112 of the glass panel 110. In one exemplary embodiment, the width, w, is about 14 mm. As will be described in greater detail below, it also has been found that the V-shaped grooves 122 should have a depth "d" of between 0.5 mm and 1.5 mm, as measured vertically downwardly from the surface of the glass in which the pattern 120 is formed. In one exemplary embodiment, the depth, d, is about 1 mm.

Optionally, following formation of the decorative pattern 120, the V-shaped grooves 122 forming the decorative pattern 120 may be polished to provide a more finished and aesthetic appearance, since the groove surfaces may appear frosted following the diamond-cutting. This may be accomplished by employing a softer wheel on the CNC Stone/Glass Router, such as a "red clay" wheel, to polish the grooves. Such a softer wheel creates friction and heat, polishing the grooves to a clearer finish.

Following formation of the decorative pattern 120, and the optional polishing, as desired, one or more air-curable resin beads 130 are applied within the substantially V-shaped grooves. Heretofore, the formation of grooves in a glass panel and the subsequent application of a resin or other material within the grooves has not been considered feasible for several reasons. First, the steps of diamond cutting the grooves 122, followed by application of the air-curable resin beads 130, must be performed on two separate machines, supplied by two different manufacturers, with separate programs. Because the dimensions of the decorative pattern 120 and grooves 122 are so minute and precise, it was not believed that one could acceptably apply any material within the grooves i.e., could not replicate the precise pattern 120 formed on another machine. For example, a variability in application of the resin of even 1 mm in any direction within the pattern 120 would provide a wavy and unacceptable product. Second, the air-curable resin is applied with a plotter, as described below. Applying the resin within a groove 122 necessitates movement of the applicator tip above the surface 112 of the glass panel 110; otherwise, movement of the applicator tip within the grooves 112, and lower than the surface of the glass, would be impeded by the pattern of the grooves, or the applicator tip could potentially drag against the surface 112 of the glass panel, outside of the pattern 120, yielding an unacceptable result. As described in greater detail below, the most efficient movement of the applicator tip, where the decorative pattern comprises a plurality of straight line segments, is not necessarily movement that is limited, during the entire application step, to travel exclusively within the grooves 122 forming the decorative pattern 120.

To solve both of these problems, the inventors found that several factors had to be considered and overcome. First, the inventors found a method, as described in greater detail below, to translate and transfer the decorative pattern 120 data, including the precise locations and orientations of the grooves 122 from the pattern forming machine, i.e., the Intermac, to the air-curable resin plotter program. Second, the inventors found that there is a relationship between the horizontal speed of the resin applicator tip, the pumping speed of the applicator unit, the height of the tip above the surfaces onto which the air-curable resin is to be deposited, and the viscosity of the air-curable resin at the time of application. It has now been found that acceptable results are obtained with a horizontal applicator tip speed of between about 280 and 320 mm per minute, a pumping speed of between about 60 and 80 ml per minute, a tip height above the horizontal glass surface (for a 1 mm deep groove) of between about 1.5 and 5.0 mm, and a resin viscosity of between about 11,000 and 16,000 centipoise, when measured with a conventional viscometer at an ambient room temperature of about 72 degrees Fahrenheit. In one exemplary embodiment, the horizontal applicator tip speed was about 300 mm per minute, the pumping speed was about 75 ml per minute, the tip height above the glass (for a 1 mm deep groove) was about 2 mm, and the resin viscosity was about 14,000 centipoise.

A continuous bead, or a plurality of segments formed from beads, of an air-curable acrylic resin is applied within the V-shaped grooves throughout the prescribed pattern. One such air-curable resin is formed by mixing a resin such as R.L. ACRY 14 with a resin hardener such as R.L.H. ACRY 15, manufactured by Creative Resins of Kent, England. A computer-driven plotter is used to apply the bead of air-curable acrylic resin in a desired pattern on a plotter table. One suitable computer-driven plotter is an X-Y plotter manufactured by Precix Advanced Cutting Technologies, Inc., Langley, British Columbia, Canada. As shown in FIG. 2, the bead of air-curable resin is applied in the substantially V-shaped grooves so that the resin bead does not extend upwardly as far as the surface 112 of the glass panel 110. The inventors have found that a bead having a width, as measured horizontally across the V-shaped groove, of between about 4.5 mm and 5.5 mm, provides a suitable and aesthetically pleasing appearance for a V-shaped groove dimensioned as described herein. In one exemplary embodiment, a bead width of about 5 mm provided optimum results when applied in the V-shaped grooves. Further, the inventors have found that a bead depth equal to or greater than the depth of the V-shaped groove, or between about 0.5 and 2.0 mm, provides a suitable and aesthetically pleasing appearance. In one exemplary embodiment, the bead has a depth of 1.0 mm.

As discussed in greater detail below, where the decorative pattern 120 comprises multiple line segments 122a-d, the initial location in the decorative pattern 120 where application/plotting of the resin bead begins must be selected so that that location intersects another line segment. Because the resin begins pumping out of the applicator tip at that point, a "ball" of resin is usually deposited at that point because the plotter has not yet begun moving; thus, when the initial point subsequently intersects with another line segment, the "ball" that is initially formed is subsumed when the other line segment is applied, therefore evening out the "ball" so that it does not create an unacceptable surface imperfection. As used herein, the term "subsumed" is intended to mean that any excess uncured resin applied will even itself out when it intersects with adjacently applied uncured resin.

Once the resin has been applied, it is allowed to air-cure for between 24 and 48 hours at an ambient temperature of approximately 72 degrees Fahrenheit. Alternatively, higher ambient temperatures or convection heating will cure the resin at an accelerated rate. Regardless of conditions, the resin must be cured to a sufficient hardness. A durometer, an instrument consisting of a flat or blunt indenter point, that is applied under pressure, is used to measure the hardness of the cured resin. Specifically, when a durometer with a 1.0 mm flat point needle is compressed against the resin for 3 seconds, creating a force of 10 Newtons at the needle point, a reading of 65 percent or above on a 0 to 100 percent scale indicates that the resin is sufficiently cured.

Figure 3:
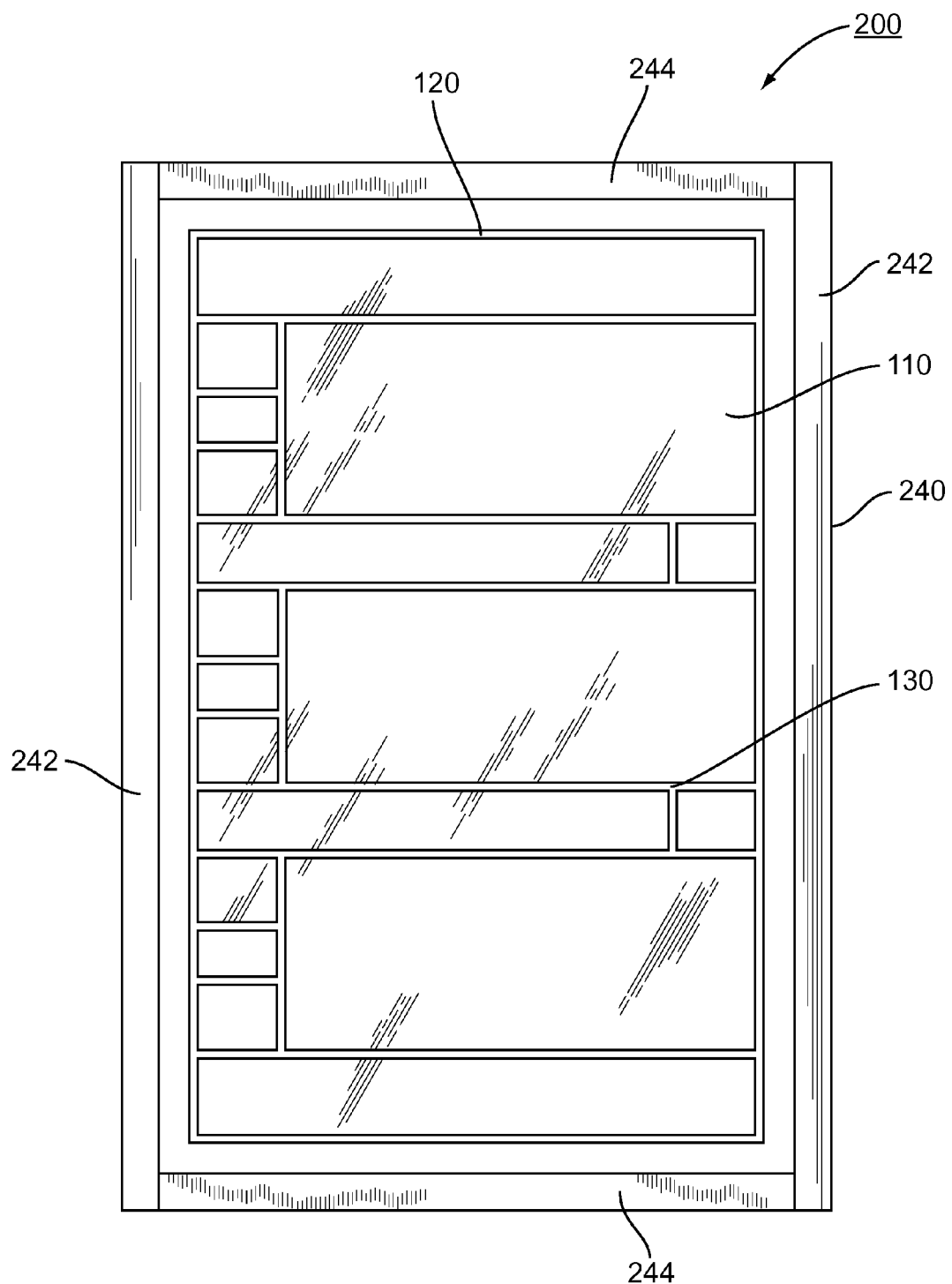
FIG. 3 is a front plan view of a decorative window or door according to the present invention.

Referring now to FIG. 3, another aspect of the present invention is a decorative window or door, shown generally as 200, comprising a peripheral support frame 240 securing and supporting the decorative glass pane 100. The peripheral support frame 240 has a pair of opposed spaced apart side pieces 242 and a pair of opposed spaced apart end pieces 244, and may be formed in any number of ways and using a variety of materials to support the decorative glass panel 100, including, for example, conventional wooden frames wherein the decorative glass panel 100 is placed within an opening formed in the frame and thereafter secured with moulding or the like.

As described above, the steps of diamond cutting the grooves 122 and the application of the air-curable resin beads 130 must be performed on two separate machines, supplied by two different manufacturers, having their own programming. The inventors have found, however, that the Intermac software can be made to provide a data output, which may be exported into a commercially available software program such as CorelDRAW®, Version 13, available from Corel Corporation. The output, or export, from Intermac is in the form of a .DXF, or AutoCAD® file. The .DXF file extension denotes a data format, which was developed by Autodesk, Inc. for use with computer-aided design (CAD) vector image files. These are similar to the .DWG format, but are more compatible with other programs which are ASCII (text) based. Also, the .DXF format was developed as a universal format so that AutoCAD® documents could be more easily opened by other programs. The .DXF data files are exported into CorelDRAW®, which in turn converts them into a .PLT data format. The .PLT format permits files originally created using AutoCAD® to be translated for printing using the X-Y plotter described above. This format also prints images using lines instead of dots, based on the Hewlett-Packard Graphics Language (HPGL). The .PLT data files from CorelDRAW® are lastly exported to the Creative Resins Studio Program, provided by Creative Resins International in Kent, United Kingdom. The Creative Resins Studio software then converts the data files into .DWG plotting commands for the X-Y plotter to apply air-curable resin along the centerline of the grooves 122 forming the entire decorative pattern 120. Both the .DXF and .PLT formats employ a centerline program, which is used for creating both the substantially V-shaped grooves forming the decorative pattern and the application of the air-curable resin so that the grooves and resin application coincide precisely. Most importantly, this ensures that the resin is precisely applied along the centerline of each substantially V-shaped groove.

Turning again to FIG. 1, the exemplary decorative pattern 120 shown comprises a plurality of straight line segments of various lengths. Those in the art will appreciate that the application of an air-curable resin by an X-Y plotter, as described above, may be a time consuming process for each decorative glass panel 100 so formed since it requires multiple movements and starts/stops of the plotter applicator. While the current plotter software is not programmed for calculating the most efficient plotting route for the plotter, for each decorative glass pattern 120, the inventors manually calculate the most time-effective applicator route and input that lastly into the program for the X-Y plotter. A part of this calculation includes the determination of starting points during movement of the plotter, so that the "balls" described above will be minimized or eliminated.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. A simulated beveled and camed monolithic decorative glass panel for a door or window, comprising:
    (a) a flat tempered monolithic glass panel, having an outer surface, an inner surface, and a thickness;
    (b) a prescribed pattern formed in at least one of the outer and inner surfaces of the flat glass panel, the prescribed pattern comprising at least one V-shaped, diamond-cut and polished groove, each groove having a width of between 9.0 mm and 19.5 mm and a depth of between 0.5 mm and 1.5 mm; and
    (c) an air-curable resin bead within the at least one V-shaped groove forming the prescribed pattern, the bead lying in the groove in such a manner as to extend upwardly to at least the level of or beyond the adjacent surface of the glass.

2. The decorative glass panel of claim 1, wherein the V-shaped groove has a width of about 14 mm.

3. The decorative glass panel of claim 1, wherein the V-shaped groove has a depth of about 1 mm.

4. The decorative glass panel of claim 1, wherein the air-curable resin is a continuous bead in the at least one V-shaped groove and has a width within the groove of between about 4.5 mm and 5.5 mm.

5. The decorative glass panel of claim 4, wherein the width of the air-curable resin bead applied in the at least one V-shaped groove has a width of about 5 mm and a depth equal to or greater than the depth of the V-shaped groove.

6. A simulated beveled and camed monolithic decorative glass door or window, comprising:
    (a) a peripheral support frame having a pair of opposed side walls and a pair of opposed end walls;
    (b) a flat tempered monolithic glass panel secured and supported by the frame and having an outer surface, an inner surface, and a thickness;
    (c) a prescribed pattern formed in at least one of the outer and inner surfaces of the flat glass panel, the prescribed pattern comprising at least one V-shaped, diamond-cut and polished groove, each groove having a width of between 9.0 mm and 19.5 mm and a depth of between 0.5 mm and 1.5 mm; and (d) an air-curable resin applied within the at least one V-shaped groove forming the prescribed pattern, the bead lying in the groove in such a manner as to extend upwardly to at least the level of or beyond the adjacent surface of the glass.

7. The decorative glass door or window of claim 6, wherein the V-shaped groove has a width of about 14 mm.

8. The decorative glass door or window of claim 6, wherein the V-shaped groove has a depth of about 1 mm.

9. The decorative glass door or window of claim 6, wherein the air-curable resin is a continuous bead in the at least one V-shaped groove has a width within the groove of between about 4.5 mm and 5.5 mm.

10. The decorative glass door or window of claim 9, wherein the width of the air-curable resin bead applied in the at least one V-shaped groove has a width of about 5 mm and a depth less than the depth of the V-shaped groove.

* * * * *